Figure 1:
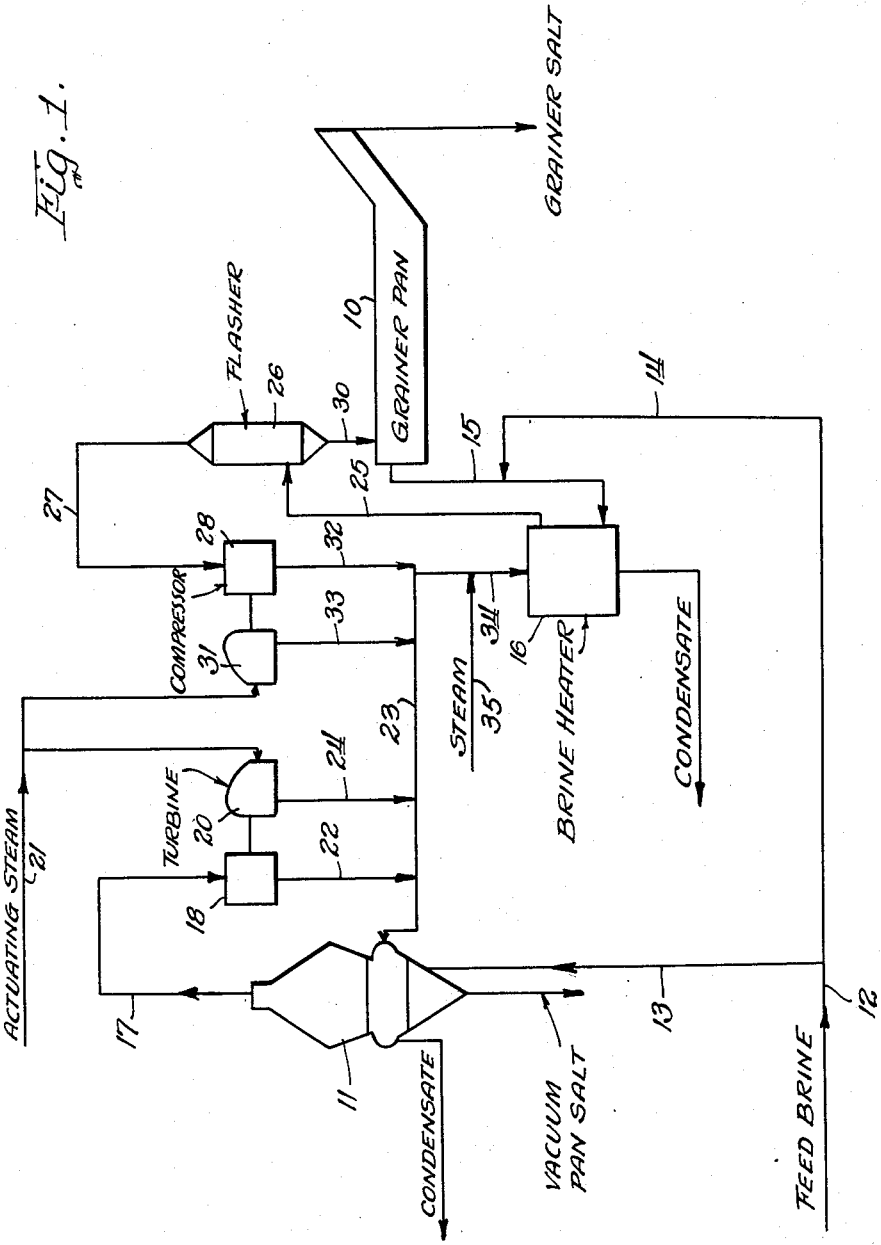

March 4, 1952 W. H. FARNSWORTH 2,588,099
BRINE EVAPORATION SYSTEM
Filed Jan. 15, 1947 2 SHEETS—SHEET 1

Inventor:
William H. Farnsworth.
By Brown Jackson Boettcher Dienner
Attys.

March 4, 1952

W. H. FARNSWORTH 2,588,099

BRINE EVAPORATION SYSTEM

Filed Jan. 15, 1947

2 SHEETS—SHEET 2

Inventor:
William H. Farnsworth
By Brown, Jackson, Boettcher, Dienner
Attys.

Patented Mar. 4, 1952

2,588,099

UNITED STATES PATENT OFFICE 2,588,099

BRINE EVAPORATION SYSTEM

William H. Farnsworth, Manistee, Mich., assignor to Morton Salt Company, Chicago, Ill., a corporation of Illinois Application January 15, 1947, Serial No. 722,188

10 Claims. (Cl. 159—21)

This invention relates, generally, to improvements in processes and apparatus for making salt by evaporation of brine, and the invention has particular relation to the integration of the vacuum pan and grainer pan processes for making salt wherein the principle of vapor recompression can be applied with full effect so as to result in large economies in heat consumption.

The bulk of the salt produced in this country is made, either by evaporating brine in vacuum pans, or in grainer pans. Steam consumption accounts for a large portion of the cost of the salt produced by these processes. Thus, approximately 1200 B. t. u. are currently consumed in producing a pound of salt in efficiently operated vacuum pans, while approximately 4550 B. t. u. are currently consumed in producing a pound of grainer salt in efficiently operated grainer pans. As will appear hereinafter, the present invention can be utilized so as to very substantially reduce the present steam consumption required in producing both vacuum pan and grainer pan salt.

As indicated by the above representative figures for heat consumption, salt can be produced considerably cheaper in the vacuum pans than in the grainer pans, due to the lower heat consumption in the former process. However, salt produced in grainer pans has distinctive physical properties which make it particularly suitable for certain needs, and a substantial market exists for this particular type of salt. The considerable demand for grainer pan salt is primarily due to its rapid rate of solubility which in turn results from its large surface area.

These conventional vacuum pan and grainer pan processes of making salt, and the apparatus therefor, are well known in the art. The characteristic feature of the grainer pan process is the requirement that hot brine be evaporated at approximately atmospheric pressure over a large surface area, with care being taken to prevent agitation of the brine surface by boiling. Due to this quiescent surface evaporation, characteristic thin, flaky crystals of salt are formed at the surface which have a relatively large surface area in respect to the mass of salt. As the crystals become sufficiently heavy due to growth, they settle to the bottom of the grainer pan and are removed to one end by reciprocating rakes.

Surface evaporation at atmospheric pressure, without boiling, is a comparatively inefficient type of evaporation, and for this reason, the grainer pan process results in a higher B. t. u. consumption per pound of salt produced by this method, than is required in making salt in vacuum pans, wherein more efficient evaporation is permitted.

By suitably integrating the vacuum pan process with the grainer pan process in accordance with the present invention, it is practical to make full use of the heat saving permitted by a vapor recompression cycle.

I am aware that the prior art contains suggestions of the application of vapor recompression to evaporative processes, including salt brine evaporation, with a view of reducing heat consumption. Although such a vapor recompression cycle or system has been theoretically attractive, very practical considerations appear to have prevented its adoption in connection with evaporative processes, particularly, the evaporation of salt brine.

The basic theory of vapor recompression is that by applying mechanical work to the compression of vapor which has already been evaporated, the temperature of the vapor can be so raised that the vapor can be utilized in the evaporative equipment for evaporating approximately an equal amount of additional vapor. In this way, the latent heat of the vapor is utilized in evaporating additional vapor rather than lost in condensation. However, usually the only economical source of energy for performing the mechanical work in compressing the vapor to the higher temperature, is the utilization of actuating steam. Such steam may be utilized either in a prime mover, such as a steam turbine or steam engine, for driving a vapor compressor, or the actuating steam may be utilized in a thermo compressor (i. e. steam jet). When actuating steam is so used, the total amount of steam resulting both from the compression of the vapor and from the partially spent actuating steam, is in considerable excess of the requirements for evaporative purposes. Accordingly, the savings effected by vapor compression are largely, or entirely, offset by the necessity of wasting the excess steam produced in the process. Usually, this excess steam cannot be put to efficient use.

As will appear in greater detail hereinafter, the grainer pan process of making salt has unique heating requirements which not only make it possible to make full application of the vapor recompression principle thereto, but also permit the vacuum pan process of making salt to be so integrated therewith that the vapor recompression principle can also be applied to full advantage to that process.

My copending application Serial No. 722,187, filed January 15, 1947, is directed to the application of vapor recompression to the grainer pan process.

The object of the present invention, generally stated, is the integration of the vacuum pan and grainer pan processes of making salt whereby the principle of vapor recompression can be applied with full effect to both processes so as to substantially reduce the present heat consumption required for production of salt by these two processes.

More specific objects of the invention, will in part be obvious, and will in part appear hereinafter.

Figure 2:
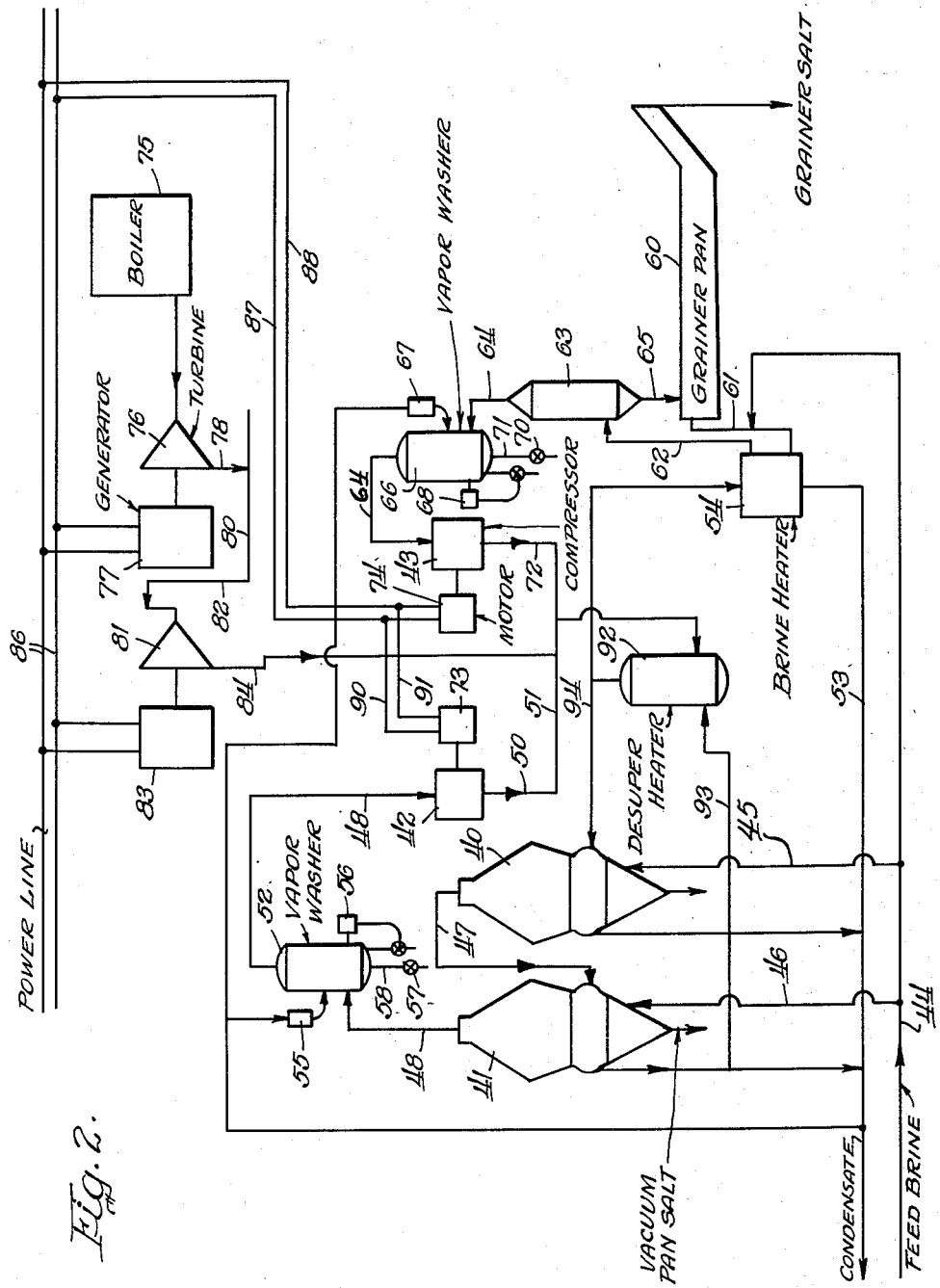

For a more complete understanding of the nature and scope of the invention, reference may now be had to the following detailed description of two preferred embodiments thereof, taken in connection with the accompanying drawings, wherein:

Figure 1 is a diagram of an integrated plant wherein the vapor recompression principle is applied to a single vacuum pan and a grainer pan concurrently producing vacuum pan and grainer pan salt; and Figure 2 is a similar diagram of an integrated plant for concurrently producing vacuum pan and grainer pan salt, wherein the vapor compression principle is applied to double-effect evaporators and a grainer pan with power for driving the vapor compressors being obtained from turbogenerator sets of relatively large capacity.

Referring first to Figure 1 of the drawings, the reference character 10 designates a grainer pan, which may be of conventional design, while reference character 11 designates a single-effect vacuum pan, which likewise may be of a conventional design. Both the grainer pan 10 and the vacuum pan 11 are supplied with feed brine from a supply line 12, having one branch 13 running to vacuum pan 11, and another branch 14 which joins with the overflow line 15 connecting the grainer pan 10, with a brine heater 16.

Vapor is withdrawn from the evaporating chamber of the vacuum pan 11 through line 17 to the suction side of a vapor compressor 18, which preferably is of the rotary type. A back pressure turbine 20 is connected in driving relationship with the vapor compressor 18, with actuating steam being supplied to the turbine 20 from the steam line 21. The vapor from the vacuum pan 11 is compressed in the vapor compressor 18 so as to raise its temperature to a predetermined degree, and the compressed steam is discharged from the compressor 18 through line 22 into a header 23. The exhaust from the turbine 20, in the form of partially spent actuating steam, is discharged into the header 23 through the discharge line 24.

Brine is heated in the brine heater 16 by heat interchange with steam, to a temperature suitable for evaporation in the grainer pan 10. The heated brine is discharged from the brine heater 16 through a line 25 to a flasher 26. The pressure on the heated brine in the flasher 26 is reduced by withdrawing the flash steam vapor through line 27 into the suction side of a vapor compressor 28.

The heated brine which has been partially concentrated due to loss of the flash steam vapor through line 27, is discharged through line 30 into the grainer pan 10 wherein it is further evaporated to produce grainer salt in accordance with the conventional practice.

The vapor compressor 28 is driven by a back pressure turbine 31 supplied wtih actuating steam from the line 21. The compressed steam from the vapor compressor 28 is discharged into the header 23 through line 32, while the exhaust from back pressure turbine 31 is delivered to the header 23 through line 33.

The degree to which the brine may be evaporated in the flasher 26 is controlled by the fact that the brine cannot be concentrated to such an extent as to induce the formation of salt crystals therein, since such crystals would not have the distinctive physical properties of grainer pan salt. Accordingly, the amount of water vapor to be withdrawn from the flasher 26 is that amount which brings the feed brine to approximate saturation at the temperature at which the brine is discharged from the flasher 26 through the line 30 into the grainer pan 10. The degree of concentration of the brine in the flasher 26 is controlled by varying the vacuum under which flashing takes place. As the vacuum is increased (i. e. absolute pressure is reduced) more water is flashed off and the temperature and pressure of the resultant vapor are lowered. Conversely, as the vacuum is decreased (i. e. absolute pressure is increased) less vapor is flashed off and the temperature and pressure in the flasher are increased. The vacuum under which the flasher 26 operates is controlled by the speed of the vapor compressor 28 which serves to produce the suction.

As will appear below, it is possible to remove about one-half of the total amount of water to be evaporated from the brine utilized for producing grainer salt, by flashing off steam vapor from the flasher 26.

A portion of the total amount of steam being delivered into the header 23 is consumed in the vacuum pan 11, while the remainder is wholly utilized in the brine heater 16 which is connected to the header 23 by the line 34. Any additional steam required in the brine heater 16 may be supplied from the steam line 35. The steam requirements of the vacuum pan 11 will be substantially less than the combined amount of steam delivered through lines 22 and 24 from the vapor compressor 18 and the exhaust of the turbine 20, respectively.

The detailed design of the plant shown in Figure 1, and described in connection therewith, and the details of the operating conditions thereof, are obviously subject to variation within practical limits. The following representative specifications and operating data for this plant will serve to illustrate one specific embodiment of the invention:

Plant capacity:
  17,400 lbs. vacuum pan salt per hr.
  8,050 lbs. grainer pan salt per hr.
Feed brine—26% salt content.
Vapor from vacuum pan—49,600 lbs./hr. at 198° F. and 11.1 p. s. i. a.—compressed to 20.78 p. s. i. a.
1,364 horse power required to compress vapor from vacuum pan.
Back pressure turbine for compressing vapor from vacuum pan requires 19,500 lbs./hr. steam @ 600 p. s. i. g.—750° TT., discharging at 20.78 p. s. i. a.
Flash steam vapor from flasher—12,280 lbs./hr. at 198° F. and 11.1 p. s. i. a.—compressed to 20.78 p. s. i. a.
337 horse power required to compress flash steam vapor.
Back pressure turbine for compressing flash steam vapor requires 4,820 lbs./hr. steam @ 600 p. s. i. g.—750° TT., discharging at 20.78 p. s. i. a.

| | |
|---|---|
| Useable heat in compressed vapor from vacuum pan _____B. t. u./hr__ | 47,000,000 |
| Useable heat in partially spent actuating steam consumed in compressing vapor from vacuum pan _____B. t. u./hr__ | 23,000,000 |
| Total heat available for vacuum pan _____B. t. u./hr__ | 70,000,000 |
| Heat required by vacuum pan ___B. t. u./hr__ | 56,900,000 |
| Surplus heat available for grainer pan _____B. t. u./hr__ | 13,100,000 |
| Useable heat in compressed flash steam vapor _____B. t. u./hr__ | 11,600,000 |
| Useable heat in partially spent actuating steam consumed in compressing flash steam vapor _____B. t. u./hr__ | 5,700,000 |
| | 17,300,000 |
| Total heat available to grainer pan—17,300,000 plus 13,100,000 _____B. t. u./hr__ | 30,400,000 |
| Heat required for grainer pan __B. t. u./hr__ | 30,400,000 |
| Total steam input to plant—19,500 plus 4,820 _____lbs./hr__ | 24,320 |
| Total heat input to plant per hr.—24,320 (1379–198) _____B. t. u./hr__ | 28,700,000 |
| Total salt output per hr.—17,400 plus 8,050 _____lbs./hr__ | 25,450 |
| B. t. u./lb. salt _____B. t. u__ | 1,128 |

It will be seen from the above data that the present invention makes it possible to produce approximately .68 lb. vacuum pan salt plus approximately .32 lb. grainer pan salt on a B. t. u. requirement of about 1,128 B. t. u. This figure is below that of approximately 1,200 B. t. u. currently required for making a pound of vacuum pan salt alone. Current heat requirements for making .68 lb. vacuum pan salt and .32 lb. grainer pan salt are approximately 2,271 B. t. u. It will be seen that this figure is more than double the heat requirement (i. e. 1,128 B. t. u.) required in accordance with the present invention.

In Figure 2 of the drawings, an integrated plant for concurrently producing vacuum pan and grainer pan salt in accordance with the principles of this invention, is shown which is somewhat more elaborate than the plant shown in Figure 1.

In the plant shown in Figure 2, two vaccum pans 40 and 41 are connected in a double-effect relationship, for producing vacuum pan salt, and the vapor compressors 42 and 43 are driven by electric motors energized by electrical current produced by turbo-generator sets.

The vacuum pans 40 and 41, are supplied with feed brine from a brine supply line 44 through branch connections 45 and 46, respectively. The evaporating chamber of vacuum pan 40 is connected with the calandria of vacuum pan 41 through the interconnecting vapor line 47. Vapor is withdrawn from the evaporating chamber of vacuum pan 41 through vacuum line 48 into the suction side of the vapor compressor 42, wherein it is compressed and discharged through line 50 into a steam header 51.

In order to protect the equipment from corrosion, particularly the vapor compressor 42, it is good design practice to provide a vapor washer 52 in vacuum line 48 so as to wash out any entrained brine which may pass off with the vapor from vacuum pan 41. The vapor washer 52 is supplied with condensate discharged into condensate header 53 from the vacuum pans 40 and 41, and from a brine heater 54. A liquid level control device 55 is provided on the vapor washer 52, so as to regulate the supply of condensate into the vapor washer. As the vapor in line 48 passes through the vapor washer 52, any brine droplets therein are removed so that the vapor leaving the washer 52 is free of entrained brine. A salinity control 56 is provided on the vapor washer 52 which serves to automatically discharge the washing water therefrom when the salinity thereof has increased to a predetermined degree. The salinity control 56 may be of the type which operates on the principle of a salt bridge so as to automatically control a discharge valve 57 in the discharge line 58.

The vapor washing step, making use of the vapor washer 52 and its asociated control equipment, is a conventional precaution involving known apparatus, and does not constitute a novel feature of the present invention.

While brine is being evaporated in vacuum pans 40 and 41 to produce vacuum pan salt, additional brine is being evaporated in a grainer pan 60 so as to produce grainer pan salt. Feed brine from line 44 is fed into the overflow line 61 connecting between the grainer pan 60 and the brine heater 54. As the brine passes through the heater 54, it is heated in interchange with steam supplied from steam header 51, as will appear in more detail hereinafter.

The brine is heated in the brine heater 54 to a temperature which is suitable for evaporation in the grainer pan 60, and leaves the heater 54 through line 62 connecting with a flasher 63. The vapor discharge outlet of flasher 63 is connected by line 64 to the suction side of the vapor compressor 43 so as to maintain a reduced pressure in the flasher 63.

Approximately one-half of the total amount of water to be evaporated from the brine in producing grainer pan salt is flashed off as vapor in flasher 63 and withdrawn through line 64 for recompression in the vapor compressor 43. As indicated above in connection with Figure 1, as much as 53.5% of the water to be evaporated may be thus flashed off. The hot, partially concentrated brine produced in the flashing step is withdrawn from the flasher 63 through line 65 into the grainer pan 60 for production of grainer pan salt in accordance with conventional practice.

Preferably, the vacuum line 64 is provided with a vapor washer 66 for removing any entrained brine from the flash steam vapor passing therethrough. As in the case of the vapor washer 52, the vapor washer 66 is supplied with condensate from the condensate header 53 under control of a flow regulator 67. The vapor washer 66 is likewise provided with a salinity control 68 which regulates a discharge valve 70 in the discharge line 71 leading from the bottom of the vapor washer 66.

Flash steam vapor from the flasher 63 is compressed in the vapor compressor 43 and discharged to the header 51 through a line 72 connected therewith.

Very often it is necessary or desirable for a salt plant to manufacture part or all of its own electrical power requirements for utilization in connection with operation of the salt plant. Turbo-generator sets operating on superheated steam are generally, the most efficient means of generating such electrical power. When a salt plant has such a power plant, it is usually advantageous to drive the vapor compressors 42 and 43 by means of electric motors, such as 73 and 74 respectively supplied with electrical power generated by the power plant. Factors of design make such an arrangement somewhat more efficient than separate back pressure turbines, such as turbines 20 and 31 utilized in the plant shown and described in connection with Figure 1.

The power generating plant shown in Figure 2 for generating electrical energy for driving the motors 73 and 74, and for the other plant requirements, comprises a high pressure boiler 75 which supplies superheated steam to the turbine 76 of a first turbo-generator set. The steam may be supplied to the turbine 76 at a pressure of about 600 p. s. i. g. and at a total temperature of 750°. The turbine 76 is connected in direct driving relationship with a generator 77 which may, for example, be of 3000 kilowatt capacity. The exhaust from turbine 76, which may be at a pressure of about 175 p. s. i. g. and a temperature of 500° F., is exhausted through line 78 to an exhaust header 80.

The exhaust from the turbine 76 is employed in driving a second turbine 81, and is supplied thereto through line 82. The turbine 81 is connected in driving relationship with an electrical generator 83 which may be of 3500 kilowatt capacity. The exhaust from turbine 81, which may be at approximately 10 p. s. i. g. and a temperature of 240° F., is discharged through line 84 into the steam header 51.

The terminals of the generators 77 and 83 are suitably connected with a power line 86, as shown. The motor 74 is connected for energization with the power line 86 through conductors 87 and 88. Likewise, the motor 73 is connected with conductors 87 and 88 by conductors 90 and 91.

The resulting steam supplied into the header 51 from the several sources outlined, will usually be superheated. From the standpoint of heat transfer capacity, it is usually desirable to de-superheat such steam before it is used in the calandria of vacuum pan 40, or in the heat exchange element of brine heater 54. Accordingly, the superheated steam from header 51 is passed through a de-superheater 92 which is supplied with condensate through line 93 from vacuum pans 40 and 41. The de-superheated steam from the de-superheater 92 is discharged into a header 94 which connects with the calandria of the vacuum pan 40 and with the heat exchange element of the brine heater 54.

As indicated above, the vacuum pans 40 and 41, in addition to utilizing all of the steam compressed by the vapor compressor 42, can only utilize a portion of the actuating steam required in generating the electrical energy for driving the motor 73, thereby leaving a surplus of steam due to the operation of the vapor recompression cycle in connection with vacuum pans 40 and 41.

However, due to the novelty of this combination of evaporative equipment, all of this surplus steam provided by vacuum pan side of the plant, may be effectively consumed in the brine heater 54 in heating feed brine. In addition to this surplus, the brine heater 54 requires the output of steam compressed by vapor compressor 43, plus the exhaust steam due to the generation of electrical energy for the driving motor 74.

It will of course be understood that the exact design details and operating conditions for different plants which may be set up for the integrated production of vacuum pan and grainer pan salt, will be somewhat different in each instance. The following data may be taken as illustrative for a plant of the type shown and described in connection with Figure 2.

An integrated plant for producing vacuum pan and grainer pan salt may be designed in accordance with Figure 2 which will have a capacity of producing 32,320 lbs. of vacuum pan salt per hour, and 13,500 lbs. of grainer salt per hour. This combined amount of salt may be produced with a total steam input equivalent to 48,430,000 B. t. u. Thus, the B. t. u. requirement per pound of salt produced (not differentiating between the two types) is approximately 1055 B. t. u. per pound. Compared with current heat requirements for producing vacuum pan and grainer pan salt (i. e. 1208 B. t. u./lb. vacuum pan salt and 4550 B. t. u./lb. grainer salt) the figure of 1055 B. t. u. represents a savings of 12.7% on vacuum pan salt and 76.8% on grainer pan salt.

Operating conditions are so maintained that de-superheated steam is supplied to vacuum pan 40 and brine heater 54 at a temperature of about 230° F. Brine is heated in brine heater 54 to a temperature of about 225° F. Vapor is withdrawn from vacuum pan 41 at a temperature of about 178° F. and pressure of 7.19 p. s. i. a., while flash steam vapor is withdrawn from flasher 63 at a temperature of about 198° F. and a pressure of about 11.1 p. s. i. a. The vapor withdrawn from both sources is compressed in vapor compressors 42 and 43 to superheated steam at a pressure of about 20.78 p. s. i. a.

It will be apparent that this invention is of a nature which permits of a number of modifications in respect to arrangement and choice of equipment and methods of operating the same, as long as the principles of the invention are adhered to. Accordingly, it is intended that all matters described above or shown in the accompanying drawings, shall be interpreted as illustrative and not in a limiting sense.

What is claimed as new is:

1. The integrated process of making vacuum pan salt and grainer pan salt which comprises, withdrawing vapor from vacuum pan evaporator means by the evaporation of brine therein so as to produce vacuum pan salt therein, compressing the withdrawn vapor by partial utilization of actuating steam, heating other brine to a temperature suitable for grainer pan evaporation by passing it in heat interchange relationship with steam, reducing the pressure on the thus heated brine so as to flash off a substantial amount of water therefrom in the form of flash steam vapor without inducing salt crystallization in the brine, delivering the thus partially concentrated hot brine from said flashing step into a grainer pan for further evaporation and production of grainer pan salt, compressing said flash steam vapor, and utilizing all of the steam provided (1) by compressing said vapor withdrawn from said vacuum pan evaporator means, (2) by the partially spent actuating steam, and (3) by compressing said flash steam vapor, in evaporating additional brine in said vacuum pan evaporator means and in heating additional brine for evaporation in said grainer pan.

2. The process called for in claim 1 wherein the said actuating steam is also partially utilized in compressing said flash steam vapor and wherein the further resulting, partially spent, actuating steam is utilized along with said steam provided by compressing said flash steam vapor.

3. The process called for in claim 1 wherein the said actuating steam is superheated and wherein, in addition to being partially spent in compressing said vapor withdrawn from said vacuum pan, the said superheated actuating steam is further partially spent in compressing said flash steam vapor.

4. The process called for in claim 1 wherein said vapor withdrawn from said vacuum pan evaporator means is compressed to a temperature at least high enough to evaporate additional brine therein and wherein said flash steam vapor is compressed to a temperature at least as high as said temperature for heating brine which is to be flashed prior to evaporation in the grainer pan.

5. The process called for in claim 1 wherein said flash steam vapor is compressed by utilization of actuating steam, and wherein all of the steam provided (1) by compressing said vapor withdrawn from said vacuum pan evaporator means, (2) by the partially spent actuating steam utilized in compressing the same, (3) by compressing said flash steam vapor, and (4) by the partially spent actuating steam utilized in compressing the same, is merged at a temperature sufficiently high for evaporating additional brine in said vacuum pan evaporator means and heating said other brine before flashing and subsequent grainer pan evaporation.

6. The process called for in claim 1 wherein said actuating steam is superheated and said vapor withdrawn from said vacuum pan evaporator means and said flash steam vapor are compressed by utilization of said superheated actuating steam, and the steam resulting from said compression, in addition to the superheated actuating steam which is partially spent in said compression is combined and de-superheated.

7. The process called for in claim 1 wherein at least one-half of the water evaporated in producing grainer salt is flashed off in the form of said flash steam vapor.

8. The integrated process of making vacuum pan salt and grainer pan salt which comprises, withdrawing vapor from vacuum pan evaporator means at a temperture within the range of about 178–198° F. so as to produce vacuum pan salt therein, compressing the withdrawn vapor to superheated steam at a pressure of about 21 p. s. i. a. by utilization of superheated actuating steam, heating brine to a temperature of about 225° F. by passing it in heat interchange relationship with steam, flashing said heated brine at a pressure of about 11 p. s. i. a., delivering the partially concentrated brine from said flashing step into a grainer pan for further evaporation and production of grainer pan salt while recycling brine from the grainer pan through the said heating and flashing steps back to the grainer pan whereby to remove by said flashing about 54% of the water content to be evaporated, withdrawing the flash steam vapor from said flashing step at a temperature of about 198° F. and said pressure of about 11 p. s. i. a., compressing the flash steam vapor to superheated steam at a pressure of about 21 p. s. i. a. by utilization of superheated actuating steam, and utilizing all of the steam provided (1) by compressing said vapor withdrawn from said vacuum pan evaporating means, including the partially spent actuating steam utilized in compressing the same, and (2) by compressing said flash steam vapor, including the partially spent actuating steam utilized in compressing the same, in evaporating additional brine in said vacuum pan evaporator means and in heating additional brine for evaporation in said grainer pan.

9. An integrated plant for producing vacuum pan and grainer pan salt which, comprises in combination, vacuum pan evaporating means for producing vacuum pan salt, a grainer pan for making grainer pan salt, a brine heater associated with said grainer pan, a vapor flasher, conduit means interconnecting the brine outlet side of said brine heater with the inlet side of said flasher, conduit means interconnecting the brine discharge of said flasher with said grainer pan, steam actuated vapor compressor means, conduit means interconnecting the vapor outlets of said vacuum pan evaporating means and said vapor flasher with the suction side of said vapor compressor means, and conduit means interconnecting the steam discharge of said steam actuated vapor compressor means with the steam inlets of said vacuum pan evaporating means and said feed brine heater.

10. The combination called for in claim 9 wherein said steam actuated vapor compressor means comprises a pair of rotary vapor compressors, the suction side of one of which is interconnected with said vacuum pan evaporating means and the suction side of the other of which is interconnected with said vapor flasher, and steam actuated prime mover means for driving said rotary vapor compressors is interconnected in power transmitting relationship therewith.

WILLIAM H. FARNSWORTH.

REFERENCES CITED

The following references are of record in the file of this patent:

UNITED STATES PATENTS

| Number | Name | Date |
|---|---|---|
| 466,210 | Wilson | Dec. 29, 1891 |
| 1,066,348 | Voorhees | July 1, 1913 |
| 1,105,387 | Weil | July 28, 1914 |
| 1,118,041 | Nobel et al. | Nov. 24, 1914 |
| 1,213,596 | DeBaufre | Jan. 23, 1917 |
| 1,478,990 | Weil | Dec. 25, 1923 |
| 1,927,555 | Oetken | Sept. 19, 1933 |
| 1,986,334 | Gearing et al. | Jan. 1, 1935 |
| 2,115,112 | Lysholm | Apr. 26, 1938 |
| 2,235,541 | Warren | Mar. 18, 1941 |

FOREIGN PATENTS

| Number | Country | Date |
|---|---|---|
| 3,080 | Great Britain | Feb. 16, 1900 |
| 500,019 | Great Britain | Feb. 1, 1939 |
| 597,136 | Great Britain | Jan. 19, 1948 |